(12) United States Patent
Kutchey et al.

(10) Patent No.: US 8,746,732 B1
(45) Date of Patent: Jun. 10, 2014

(54) AIRBAG ASSEMBLY LOAD DISTRIBUTING STRUCTURE

(71) Applicant: Autoliv ASP, Inc., Ogden, UT (US)

(72) Inventors: Michael Kutchey, Ortonville, MI (US); David W. Schneider, Waterford, MI (US); John F. Witt, Jr., Clinton Township, MI (US); Jamie R. Fritz, Macomb, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/836,176

(22) Filed: Mar. 15, 2013

(51) Int. Cl.
*B60R 21/20* (2011.01)
*B60R 21/217* (2011.01)
*B60R 21/206* (2011.01)

(52) U.S. Cl.
CPC ............. *B60R 21/217* (2013.01); *B60R 21/206* (2013.01); *B60R 21/2171* (2013.01)
USPC .................................................... 280/728.2

(58) Field of Classification Search
CPC .. B60R 21/217; B60R 21/2171; B60R 21/206
USPC .................................................... 280/728.2
See application file for complete search history.

(56) References Cited

U.S. PATENT DOCUMENTS

| | | | | |
|---|---|---|---|---|
| 6,173,988 B1 * | 1/2001 | Igawa | ......................... | 280/728.2 |
| 7,185,912 B2 * | 3/2007 | Matsuura et al. | ........... | 280/728.3 |
| 7,306,257 B2 * | 12/2007 | Yoshikawa et al. | ........ | 280/728.2 |
| 7,377,539 B2 * | 5/2008 | Tsujimoto et al. | ......... | 280/728.2 |
| 7,530,595 B2 * | 5/2009 | Naruse et al. | ............... | 280/730.2 |
| 7,604,250 B2 * | 10/2009 | Hotta et al. | ................ | 280/728.2 |
| 7,611,195 B2 * | 11/2009 | Yoshikawa et al. | ........ | 297/216.1 |
| 7,798,517 B2 * | 9/2010 | Ishida | ......................... | 280/728.2 |
| 7,946,611 B2 * | 5/2011 | Chavez et al. | .............. | 280/728.2 |
| 8,016,317 B1 * | 9/2011 | Bruyneel et al. | ............ | 280/728.2 |
| 8,056,922 B2 * | 11/2011 | Mitsuo et al. | .............. | 280/728.2 |
| 8,235,414 B2 * | 8/2012 | Matsushima et al. | ....... | 280/728.2 |
| 8,360,464 B2 * | 1/2013 | Enders | ........................ | 280/730.1 |
| 8,500,155 B2 * | 8/2013 | Enders | ........................ | 280/728.2 |
| 8,567,818 B2 * | 10/2013 | Umemura et al. | ............ | 280/731 |
| 8,602,445 B2 * | 12/2013 | Williams et al. | ............ | 280/728.2 |
| 2004/0124617 A1 * | 7/2004 | Morita | ........................... | 280/732 |
| 2007/0200322 A1 * | 8/2007 | Sakakida | .................... | 280/730.1 |
| 2007/0246920 A1 * | 10/2007 | Abele et al. | ................. | 280/730.1 |
| 2008/0272579 A1 * | 11/2008 | Breed et al. | ................. | 280/728.2 |
| 2011/0148077 A1 | 6/2011 | Enders | | |
| 2011/0227318 A1 * | 9/2011 | Schorle et al. | .............. | 280/728.2 |
| 2013/0264802 A1 * | 10/2013 | Fischer | ........................ | 280/728.2 |

\* cited by examiner

*Primary Examiner* — Nicole Verley
(74) *Attorney, Agent, or Firm* — Stoel Rives LLP (57) ABSTRACT

An airbag assembly can include an inflator that may exert forces on an airbag housing during deployment of an airbag from the housing. The airbag assembly can include a load distributing plate to distribute or delocalize the forces. In some arrangements, the load distributing plate can be attached to the inflator.

19 Claims, 11 Drawing Sheets

AIRBAG ASSEMBLY LOAD DISTRIBUTING STRUCTURE

TECHNICAL FIELD

The present disclosure relates generally to the field of automotive protective systems. More specifically, the present disclosure relates to housing and mounting assemblies for inflatable airbag cushions.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other. The terms "abut" and "abutting" refer to items that are in direct physical contact with each other, although the items may not necessarily be attached together.

Inflatable airbag systems are widely used to minimize occupant injury in a collision scenario. Airbag modules or assemblies have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, knee airbag, or any other airbag type.

During installation, the airbags are rolled, folded, or both, and are retained in a packaged configuration. During a collision event, vehicle sensors trigger the activation of an inflator, which rapidly fills the airbag with inflation gas. Various forces or loads may be exerted on the airbag assembly during the deployment and inflation processes. The forces may damage one or more components of the airbag assembly and may cause the airbag assembly to fail. In other or further arrangements, the deployment forces may damage the vehicle structure to which the airbag assembly is mounted.

In certain embodiments, a load distributing plate may be utilized to reduce and/or eliminate the damage caused by the deployment and inflation processes, or stated otherwise, can prevent an airbag assembly from failing. For example, in some embodiments, the load distributing plate can be coupled with a housing to prevent stresses from damaging a housing. The load distributing plate may distribute or delocalize the forces that would otherwise be exerted on specific portions of the housing in the absence of the load distributing plate, which can reduce the likelihood of failure or prevent the housing from failing at those specific portions. While the figures and disclosure herein are generally directed towards an airbag assembly configured to be mounted in a knee bolster of a vehicle, it will be appreciated that the load distributing plate may be utilized with other types of airbag assemblies. This disclosure is therefore not limited to utilizing a load distributing plate with any particular airbag assembly and may be applicable to a variety of airbag assemblies, including driver, passenger, or curtain airbag assemblies, soft pack airbag assemblies, airbag assemblies with and without covers, etc.

FIGS. 1A-1D depict side elevation views of an illustrative airbag assembly 100 changing from a packaged configuration to an inflated, deployed configuration. As shown in FIGS. 1A-1D, the airbag assembly 100 may comprise an inflatable airbag cushion 110, an airbag housing 120, a housing cover 130, a load distributing plate 160, and an inflator 150. For clarity, a lateral sidewall of housing 120 is not depicted in the views of FIGS. 1A-1D (but is shown in FIG. 2). The load distributing plate 160 may also be referred to as a load distributing structure or as a load distributing bracket.

The airbag assembly 100 is depicted as being in a low mount position in a knee bolster 12 of a vehicle 10. When in a low mount position, the cover 130 may be said to be horizontally oriented and/or parallel with a floor of the vehicle. In other embodiments, the airbag assembly 100 may be mounted in a mid- or high-mount position, which positions are well known in the art. In yet other embodiments, the airbag assembly 100 may be mounted in any other position known in the art depending on the type of airbag assembly that is being used.

Figure 1A:
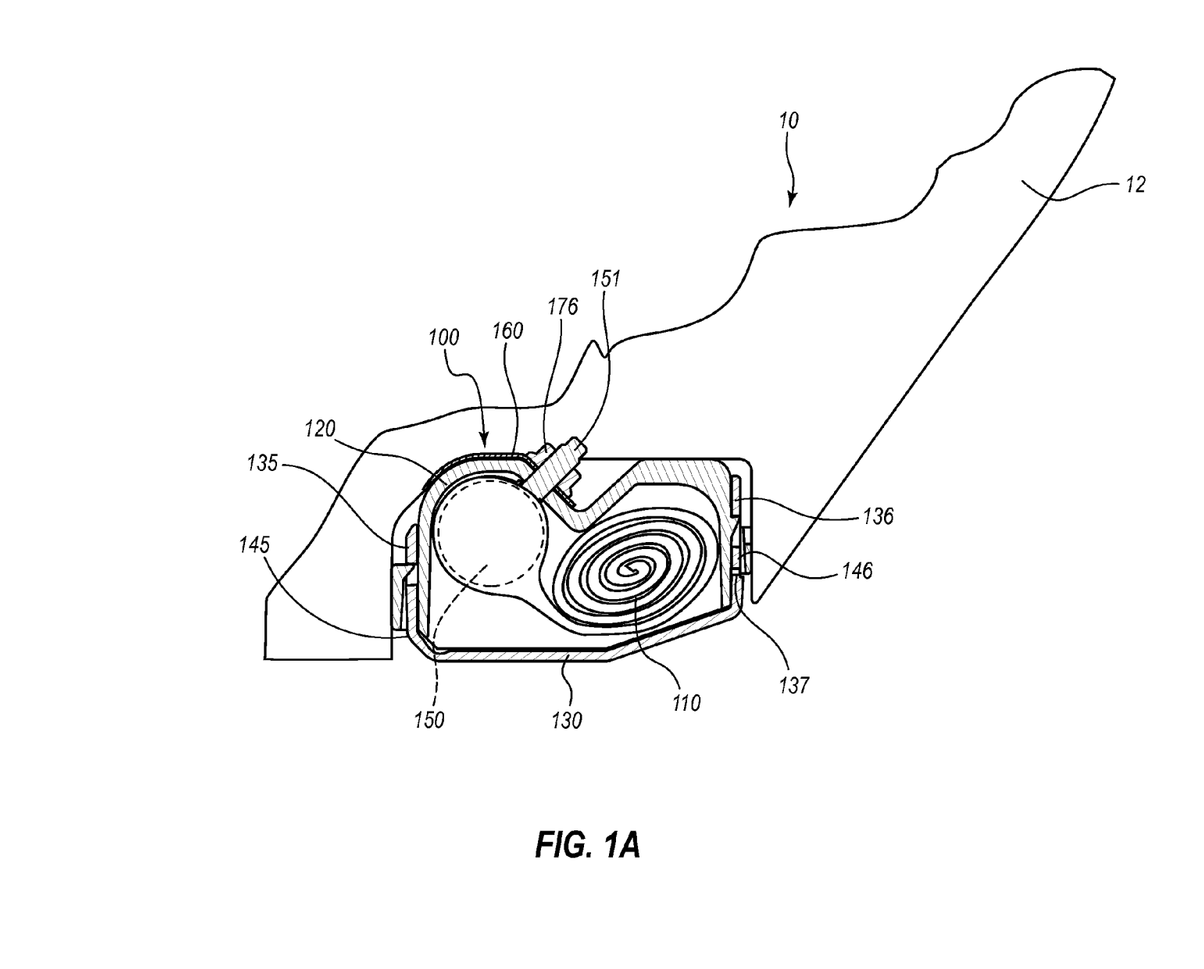
FIG. 1A is a side cross-sectional view of an airbag assembly, wherein the airbag assembly is in a packaged configuration and is attached to a vehicle under a knee bolster of the vehicle.
Figure 2:
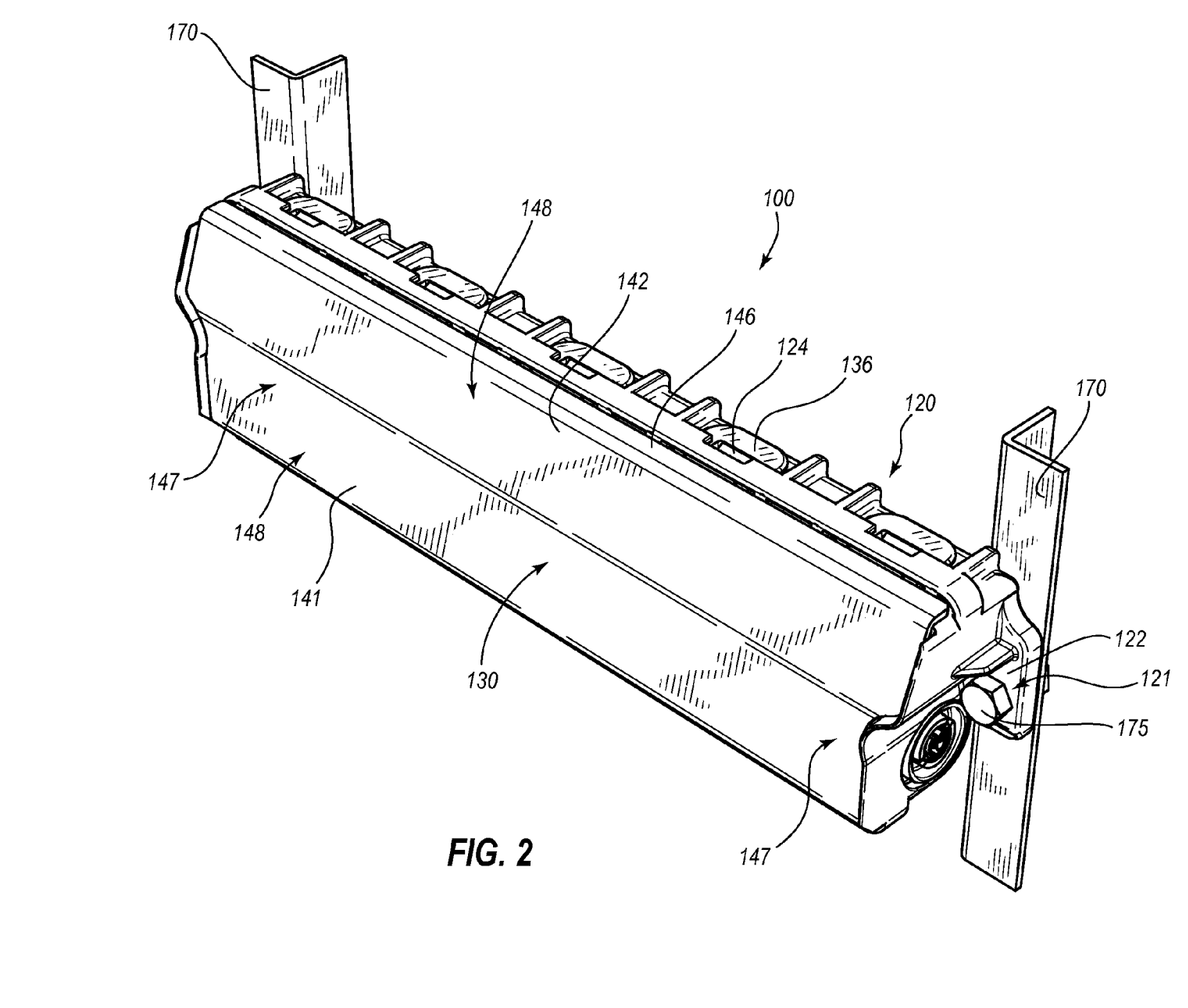
FIG. 2 is a front perspective view of the airbag assembly of FIG. 1A in the packaged configuration and attached to a vehicle structure.

In the depiction of FIG. 1A, the airbag assembly 100 is in a packaged configuration, wherein the airbag cushion 110 is in a rolled and/or folded state and is retained within the housing 120 via the cover 130. The cover 130 may include a tear seam 137 located on a car-rearward portion, a car-forward end cap 145 that extends to a plurality of car-forward tabs 135, and a car-rearward end cap 146 that extends to a plurality of car-rearward tabs 136.

Figure 1B:
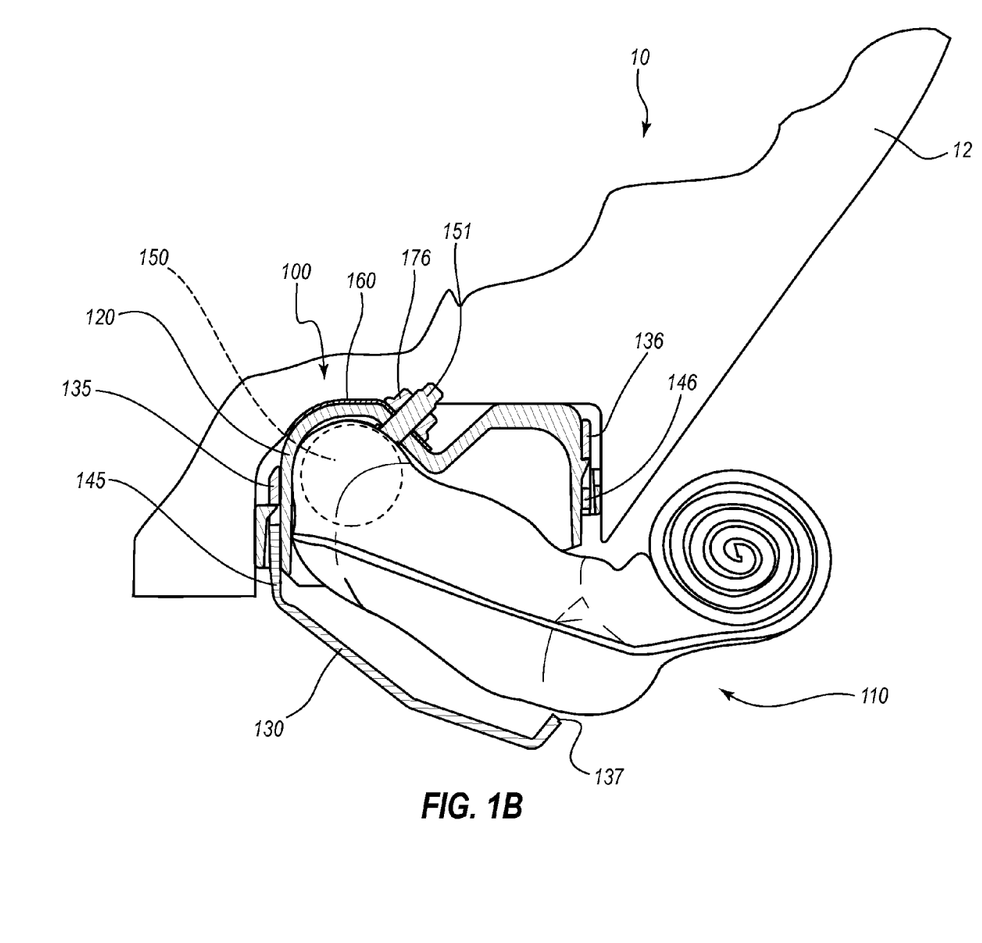
FIG. 1B is a side cross-sectional view of the airbag assembly of FIG. 1A after an airbag has begun to be deployed.

In the depiction of FIG. 1B, the inflator 150 has been activated and the airbag cushion 110 has begun to be inflated. The inflator 150 is fluidly coupled with the airbag cushion 110 such that inflation gases that exit the inflator 150 enter the airbag cushion 110 to fill the cushion. The tear seam 137 in the cover 130 (see FIG. 1A) has ruptured and a portion of the airbag cushion 110 has exited the housing 120 in a car-rearward direction. In the illustrated embodiment, the cover 130 may be configured to aid the airbag cushion 110 in obtaining an initial trajectory that may be described as being primarily car-rearward, rather than car-downward, although other arrangements are also possible.

Figure 1C:
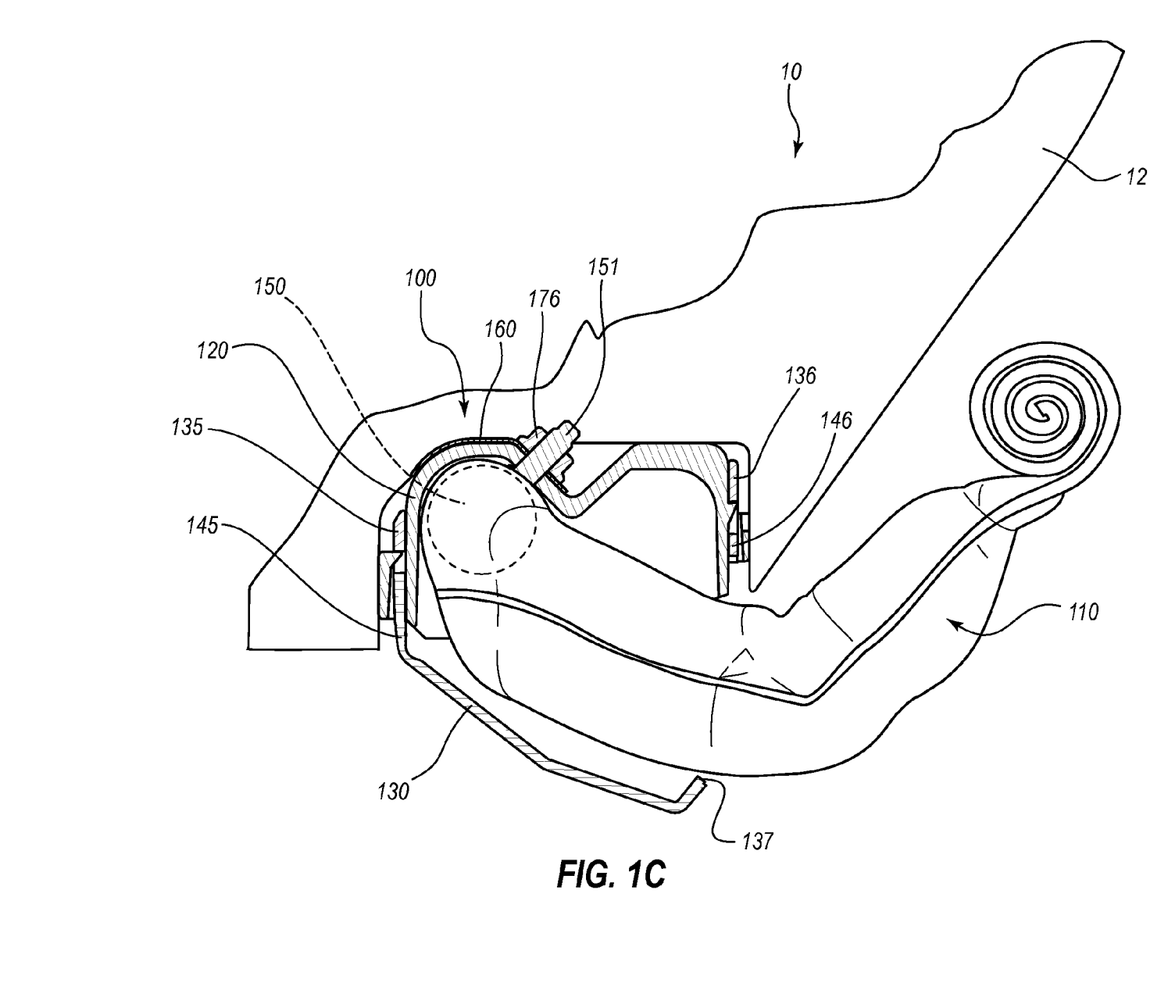
FIG. 1C is a side cross-sectional view of the airbag assembly of FIG. 1A at a later time during airbag deployment.

In the depiction of FIG. 1C, the inflator 150 is continuing to generate inflation gas such that the airbag cushion 110 is continuing to be inflated; however, at this point in the airbag deployment, a primary direction of the airbag cushion 110 deployment trajectory is in a car-upward and car-rearward direction, such that the airbag can be said to deploy parallel with the knee bolster 12.

Figure 1D:
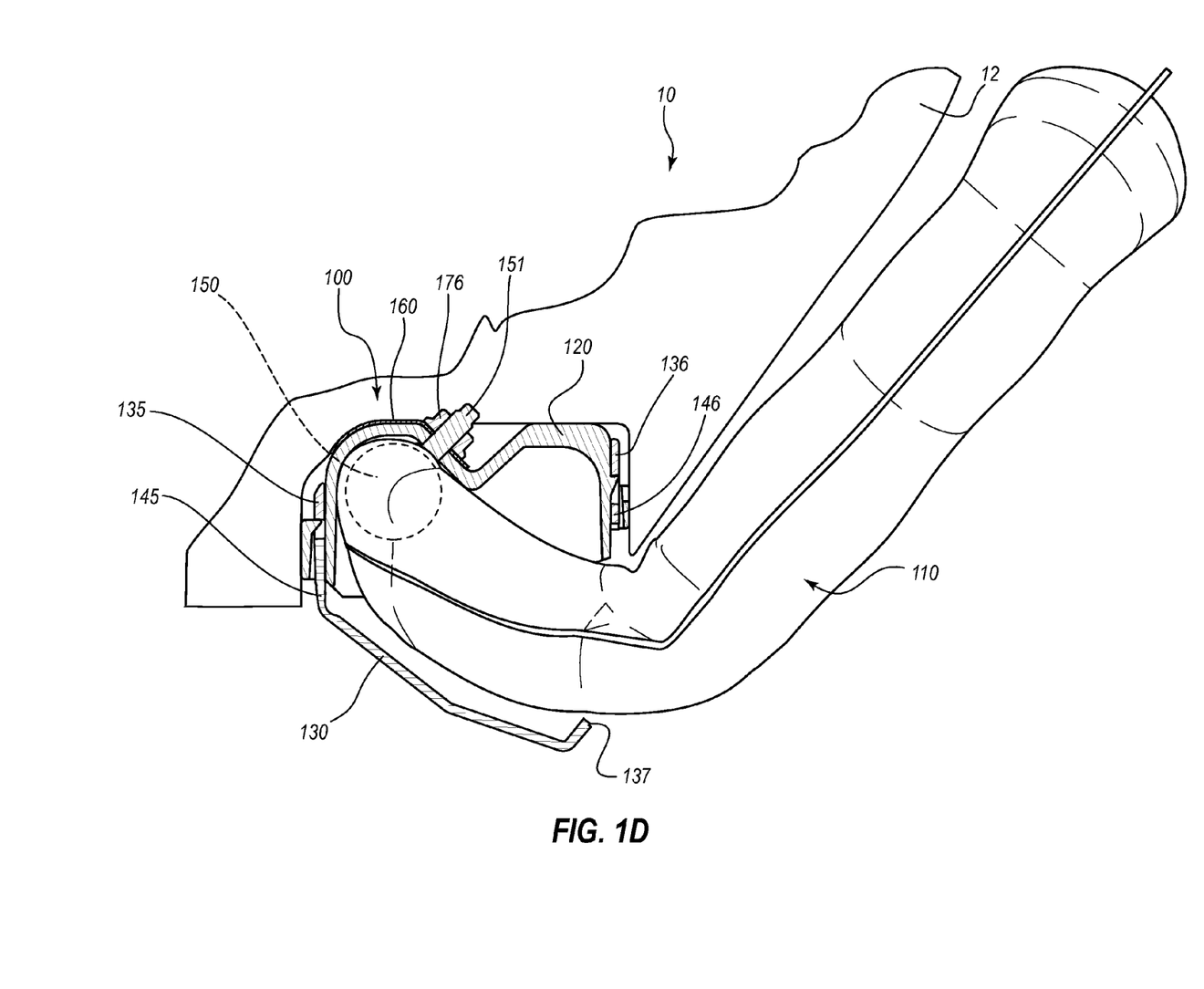
FIG. 1D is a side cross-sectional view of the airbag assembly of FIG. 1A, wherein the airbag assembly is in an inflated, deployed configuration.

FIG. 1D depicts the airbag assembly 100 in an inflated, deployed configuration. The airbag cushion 110 may be said to be fully inflated or expanded. During and after deployment of the airbag cushion 110, the cover 130 may be configured to remain attached to the housing 120 via the plurality of car-forward tabs 135 that extend from the car-forward end cap 145. The plurality of car-rearward tabs 136 may also remain coupled to the housing 120, although the car-rearward tabs 136 may be severed from the car-rearward end cap 146 and the rest of the cover 130 at the tear seam 137.

As can be appreciated from the foregoing discussion, various forces or loads may be exerted on the airbag assembly 100 during deployment and inflation of the airbag cushion 110. The forces may include axial, radial, and/or torsion forces. The forces may be localized at one or more positions of the housing 120 and may cause significant stress to those portions of the housing 120. For example, in some embodiments, the inflator 150 includes one or more mounting stems 151 that are used to attach the inflator 150 to the housing 120. The mounting stems 151 can be fixedly attached to the inflator 150 in any suitable manner, and in some embodiments, the mounting stems 151 are integral with the inflator 150. In the illustrated embodiment, a mounting stem 151 extends through the housing 120 and an exteriorly positioned portion of the mounting stem 151 is coupled with any suitable mounting hardware 176 (e.g., a nut) to securely fasten the mounting stem 151, and hence, the inflator 150, to the housing 120. During deployment, as the inflator 150 generates and/or expels inflation gas at high velocity to fill the airbag 110, forces may be exerted at the localized region at which the mounting stem 151 of the inflator 150 is coupled to the housing 120.

The load distributing plate 160 may be utilized to reduce, minimize, and/or eliminate the damage caused by these localized forces. For example, the load distributing plate 160 may be configured to distribute or delocalize the forces that are being exerted at or near the region where the mounting stem 151 is coupled to the housing 120. The load distributing plate 160 may also increase the strength of the housing 120. The load distributing plate 160 may also be referred to as a stress distribution bracket or as a load distributor.

The load distributing plate 160 may be coupled to the housing 120. For example, the load distributing plate 160 may be coupled to a rear face or an exterior surface of the housing 120. In some embodiments, the load distributing plate 160 is not directly coupled to a vehicle structure. Rather, the load distributing plate 160 may be coupled to the housing 120 independently from the vehicle structure or at a position that is spaced from one or more regions at which the housing is coupled to the vehicle structure. As depicted in FIGS. 1A-1D, for example, the load distributing plate 160 may be coupled to the housing 120 via a mounting stem 151 and complimentary mounting hardware 176. The load distributing plate 160 may be coupled to the housing 120 such that it does not directly distribute or transfer forces to any portion of the vehicle structure, but rather, the load distributing plate 160 may be configured to distribute or transfer forces directly to the airbag housing 120. By way of example, in the embodiments depicted in FIGS. 1A-1D, the reactive forces that arise when the inflator 150 is activated and is ejecting inflation gases may tend to pull on the mounting hardware 176 toward the interior of the housing 120. Moreover, torsional forces may arise relative to the mounting stem 151 that may also tend to urge one or more portions of the mounting hardware 176 inwardly. In the absence of the load distributing plate 160, the mounting hardware 176 may press against an exterior surface of the housing 120, and in some instances, the pressure may be uneven and/or may increase or decrease over time at various regions of the mounting hardware 176. Such forces may weaken the housing 120 and/or otherwise cause the housing 120 to fail such that the housing 120 cracks or is otherwise deformed and/or such that the mounting hardware 176 is pulled through the housing 120. Failures such as these can negatively affect operation of the airbag assembly 100. The load distributing plate 160 can ameliorate and/or eliminate one or more of the foregoing conditions by redistributing, relocating, delocalizing, or otherwise transitioning one or more of the forces just described.

FIG. 2 is a front perspective view of the airbag assembly 100 of FIG. 1A, wherein the airbag assembly 100 has been coupled to a vehicle structure 170 in any suitable manner. In the illustrative embodiment, the portion of the vehicle structure 170 to which the airbag assembly 100 is mounted includes mounting brackets that are at either longitudinal end of the housing 120. The housing 120 of the airbag assembly 100 may comprise a suitable number of mounting regions 121 at which the housing is directly attached to the vehicle structure 170. In the illustrated embodiment, the housing 120 defines two mounting regions 121, and each mounting region 121 is at an opposing longitudinal end of the housing 120, as discussed further below.

In some embodiments, the mounting region 121 may comprise a mounting flange 122, which may be integral with the housing 120. As shown in FIG. 2, the mounting region 121 may extend from an end of the housing 120. For example, the mounting region 121 may extend from a lateral side of the housing 120. The mounting region 121 may be configured to couple the airbag assembly 100 to a vehicle structure 170 via any suitable mounting hardware 175, such as a bolt and a nut.

In some embodiments, the airbag assembly 100 may comprise a cover 130. The cover 130 may be substantially rectangular in shape, and may have two opposing laterally extending sides 147 and two opposing longitudinally extending sides 148. Each of the longitudinally extending sides 148 may comprise end caps, such as the car-rearward end cap 146 and the car-forward end cap, whereas neither laterally extending side 147 comprises an end cap. The cover 130 may also be described as having a car-forward portion 141 and a car-rearward portion 142.

The cover 130 may be coupled to the housing 120. As previously discussed, the car-rearward end cap 146 may extend to a plurality of car-rearward tabs 136. Similarly, although not depicted, the car-forward end cap may extend to a plurality of car-forward tabs. Each of the plurality of car-rearward tabs 136 and the plurality of car-forward tabs may comprise apertures. One or more protrusions 124 disposed on the housing 120 may engage the apertures of the car-rearward tabs 136 and car-forward tabs to couple the cover 130 to the housing 120. The protrusions 124 and apertures of the car-rearward tabs 136 and car-forward tabs may thus be described as structures for coupling the cover 130 to the housing 120.

Figure 3:
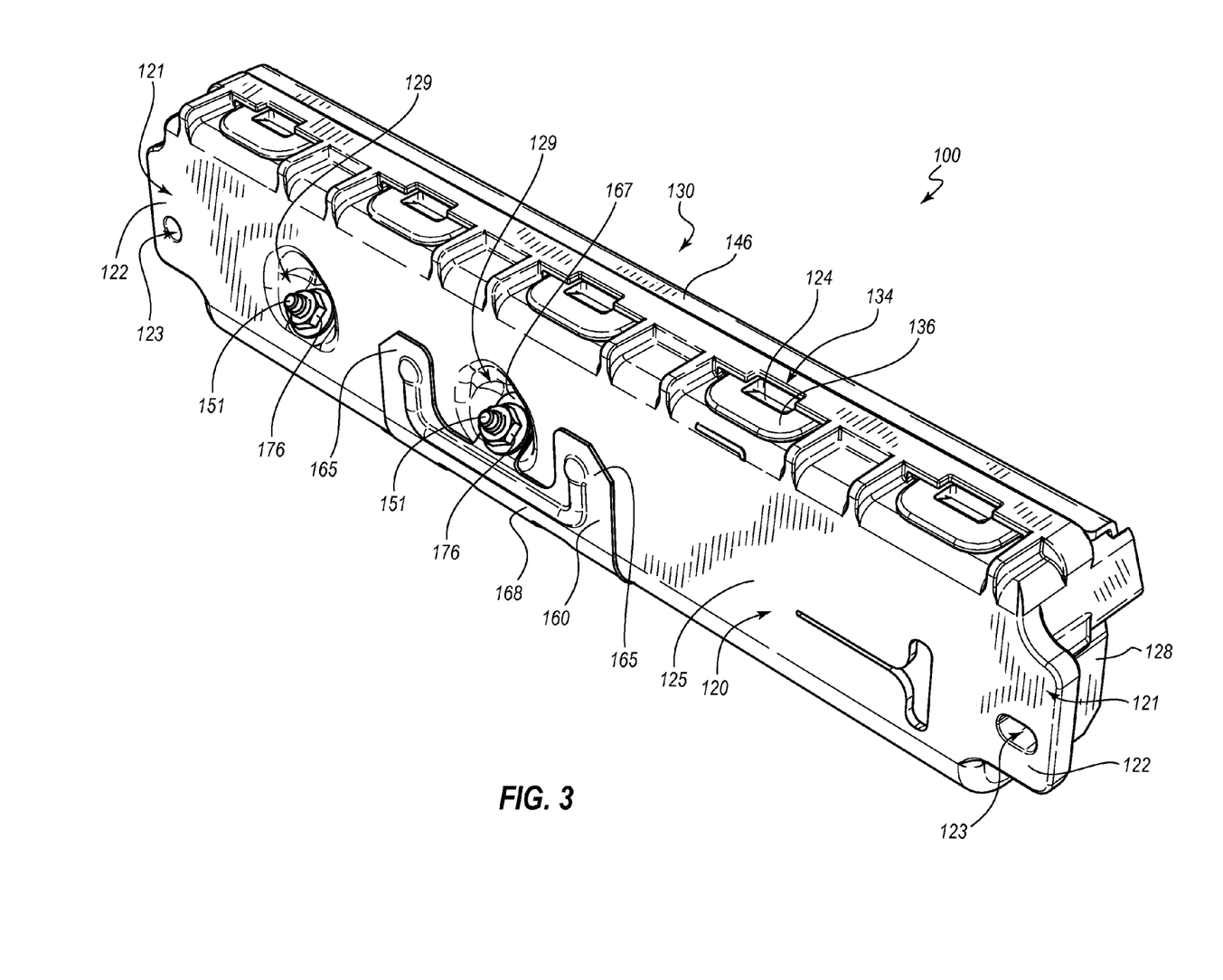
FIG. 3 is a rear perspective view of the airbag assembly of FIG. 1A shown unattached to a vehicle structure.

FIG. 3 is a rear perspective view of the airbag assembly 100 of FIG. 2, depicting the load distributing plate 160 coupled to the housing 120. As shown in FIG. 3, the housing 120 may comprise a back wall 125 and two opposing laterally extending sidewalls 128 that are at opposite longitudinal ends of the housing 120. The housing 120 further comprises one or more protrusions 124. Also visible in the figure are portions of the cover 130, including the car-rearward cap 146 that extends to a plurality of car-rearward tabs 136. Each of the car-rearward tabs 136 comprises an aperture 134 that is configured to engage with a protrusion 124 of the housing 120 to couple the cover 130 to the housing 120.

The illustrated housing 120 comprises two mounting regions 121. Each mounting region 121 comprises a mounting flange 122 at a longitudinal end of the back wall 125. The mounting regions 121 further comprise apertures 123. The apertures 123 may be configured to receive mounting hardware (e.g., complementary hardware, such as a bolt and nut) via which the airbag assembly 100 is coupled to the vehicle structure 170. In the illustrated embodiment, the mounting regions 121 are defined in their entirety by the flanges 122 and the openings 123. That is, the mounting regions 121 are restricted to the longitudinal ends of the housing 120 and are spaced from the load distributing plate 160.

As shown in the illustrated embodiment, the load distributing plate 160 may be coupled to a rear face or exterior surface of the housing 120 via the mounting stem 151 of the inflator and the complementary mounting hardware 176. The mounting stem 151 of the inflator may protrude through an aperture in the back wall 125. The mounting stem 151 may comprise threaded bolts or studs and the mounting hardware 176 may comprise a nut, although other suitable arrangements are contemplated.

The load distributing plate 160 may be coupled to the housing 120 at a location that is outside of, spaced from, or that is otherwise not included in the mounting region 121. In some embodiments, the load distributing plate 160 may be coupled to the housing 120 at or near a substantially longitudinally central region of the housing 120, whereas the mounting region 121 may be at or near an end of the housing 120. The load distributing plate 160 may thus be described as being coupled to the housing 120 and distanced from the mounting region 121. The load distributing plate 160 may also be described as not abutting or overlapping the mounting region 121. The load distributing plate 160 is thus coupled to the housing 120 separately and independently from the mounting regions 121, in the illustrated embodiment. The load distributing plate 160 of the illustrated embodiment is thus configured to not directly couple to a vehicle structure. The load distributing plate 160 is also configured such that it does not transfer forces directly to the vehicle structure.

Figure 4:
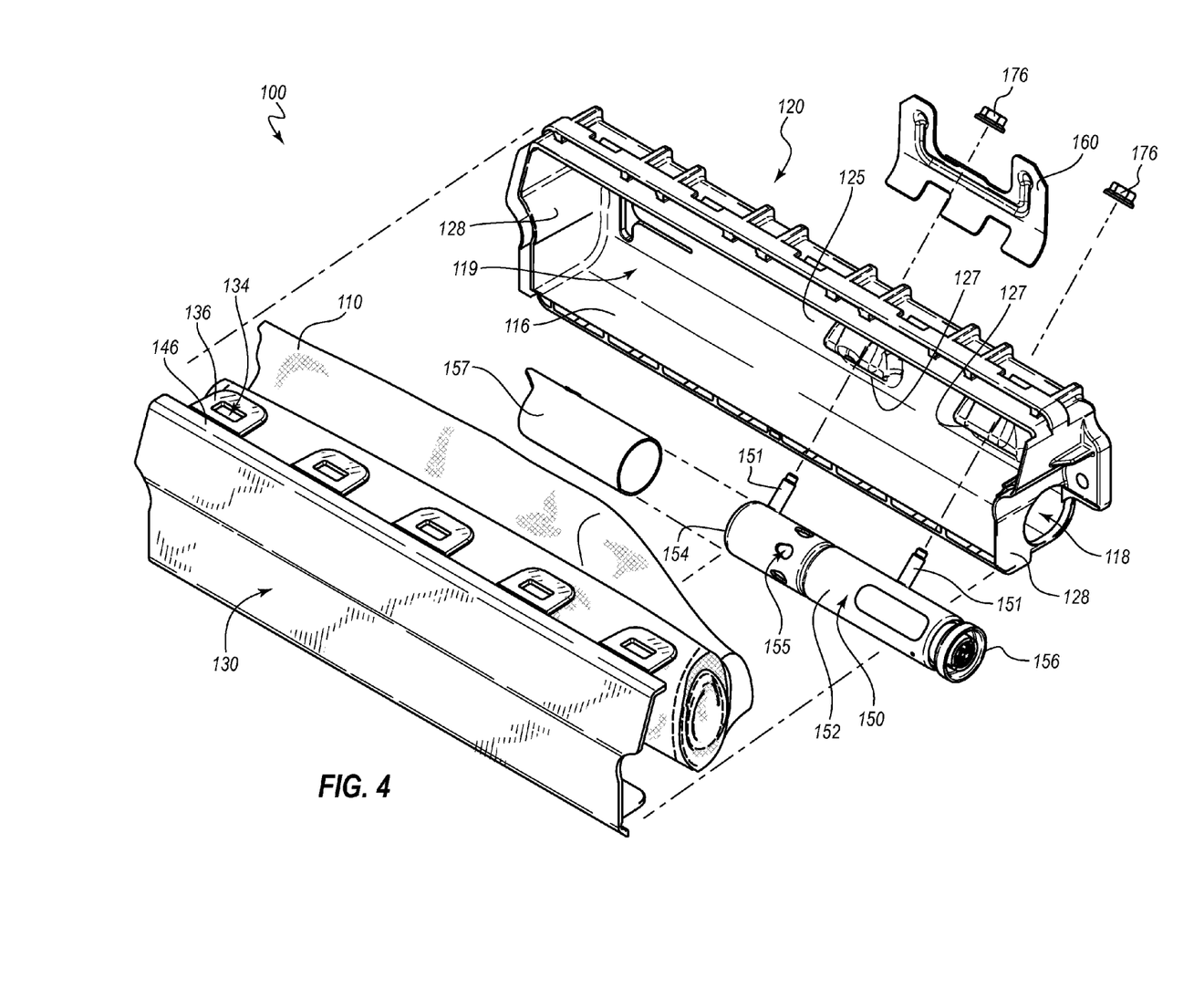
FIG. 4 is an exploded perspective view of the airbag assembly of FIG. 1A.

FIG. 4 is an exploded view of the airbag assembly 100 of FIG. 2, which provides another view of the housing 120, the cover 130, the inflator 150, the airbag cushion 110, and the load distributing plate 160. As shown in FIG. 4, a cavity, chamber, or interior void 119 of the housing 120 may be partially defined by a back wall 125, two opposing longitudinally extending sidewalls 116 and two opposing laterally extending sidewalls 128. One laterally extending sidewall 128 may comprise an inflator insert aperture 118, which is configured to be aligned with an inflator insert aperture of the airbag cushion 110 such that the terminus 156 of the inflator 150 can be accessed or viewed even after the airbag assembly 100 is in a packaged configuration (as shown in FIG. 2).

The cover 130 comprises a car-rearward end cap 146 extending to a plurality of car-rearward tabs 136. Similarly, although not depicted, the cover 130 comprises a car-forward end cap that extends to a plurality of car-forward tabs. Each of the plurality of car-rearward tabs 136 comprises apertures 134 that are configured to engage with the protrusions disposed on the housing 120.

In the illustrated embodiment, the housing and the cover are separate components that are configured to be coupled to one another. In other embodiments, the housing may comprise an integrated cover, such that the housing may be said to comprise a one-piece housing with a cover that is attached via a hinge. In yet other embodiments, the housing may be configured such that it does not utilize a cover at all.

A variety of types and configurations of airbag housings and covers may be employed. For example, in one embodiment, the housing and/or cover may comprise a stamped steel piece. In another embodiment, the housing and/or cover may comprise steel and plastic. The housing and cover may also comprise one or more of a variety of materials, including, for example, nylon, styrene ethylene butylene styrene (SEBS) block copolymers, polyolefin monomers or co-block polymers, polypropylene monomers or co-block polymers, thermoplastic elastomer olefin (TEO), and thermoplastic polyester elastomers (TPE). Certain of such materials may be sold under the trade names Hytrel, Tefabloc, Tosl, Sumitomo, Tekron, Basell, Hostacom, Multiflex, and TES.

In certain embodiments, the housing 120 can be rigid to provide reactive forces to the airbag 110 that tend to urge the airbag 110 to expand toward an exterior of the housing 120. The housing 120 can aid in directing the expansion of the airbag 110. For example, where the walls 116, 125, 128 are rigid and relatively immovable as the airbag 110 is deployed, the walls 116, 125, 128 can cause the airbag 110 to deploy in a direction that is generally away from the back wall 125. Further, in cooperation with the cover 130 and its opening characteristics, the deploying airbag 110 can be directed in a desired deployment pattern or direction that may additionally be generally away from one of the walls 116.

Although the housing 120 can be formed from any of a wide variety of materials (such as those discussed above) to achieve a desired rigidity, in some embodiments it can desirable for the housing 120 to nevertheless be lightweight, which can improve fuel efficiency of a vehicle. In other or further embodiments, the housing 120 may desirably be formed of relatively less material and/or thinner material, which can improve fuel efficiency and/or reduce manufacturing costs. Accordingly, in many embodiments, it may be desirable for the housing 120 to be formed of a lightweight, thin, and/or structurally weaker material, as compared with assemblies that do not include a load distributing plate 160.

Rendering the housing 120 lightweight and/or thinner or potentially less rigid, it is desirable not to sacrifice performance of the housing 120 and/or its structural integrity. The load distributing plate 160 can permit such alterations to the material or structure of the housing 120 by redistributing forces that act on focused regions of the housing 120 to portions of the housing 120 that are spaced from those focused regions and/or to a larger area of the housing 120. In other embodiments, the load distributing plate 160 may be used for reinforcement of the housing 120 even where housing 120 is heavier, thicker, and/or stronger.

In some embodiments, the load distributing plate 160 may have a greater stiffness and/or a lower susceptibility to breaking than do the portions of the housing 120 that are reinforced by the load distributing plate 160. For example, in some embodiments, the back wall 125 of the housing may be formed of a hard plastic that may be susceptible to breaking under large stress loads, and the load distributing plate 160 may be formed of a metallic material that is generally uninfluenced or merely bends under the same loads.

As discussed above with respect to FIG. 3, the load distributing plate 160 can be independent of or spaced from the mounting regions 121 at which the housing 120 is directly attached to a vehicle structure 170. This independence of the load distribution plate 160 from the mounting regions 121 can facilitate design and manufacture of the housing 120. For example, the load distribution plate 160 can permit the design of a housing 120 for placement in a compartment of a specific vehicle and redesign of the housing 120 for placement in a differently shaped compartment of a different vehicle without altering the manner by which the housing 120 is attached to the various vehicle structures. By way of further illustration, the different housings 120 can be designed to merely couple with the vehicle structures at any suitable position at which mounting flanges 122 can be provided at an outer edge of the housing 120, and the load distribution plate 160 can be spaced from or independent of the mounting flanges 122. In such an arrangement, the housing 120 is independently designed to include regions at which the housing 120 is coupled with the vehicle structure and one or more additional, separate regions at which the housing 120 is reinforced by the load distribution plate 160. The load distribution plate 160 may directly redistribute forces to portions of the housing 120, and may only indirectly redistribute forces relative to the vehicle structure, as the load distribution plate 160 is independent of, separate from, and/or not directly attached to any portion of the vehicle structure.

The inflator 150 may be coupled to an interior surface of the housing 120. The inflator 150 may also be configured to fit within the interior void 119 and against the back wall 125 of the housing 120. In some embodiments, the inflator 150 may comprise a tubular body 152, a first terminus 156, a second terminus 154, and one or more mounting stems 151. The illustrated inflator 150 includes two mounting stems 151, one of which is proximal to the first terminus 156 and the other of which is more distally located relative to the first terminus 156. The inflator 150 may also comprise vents or ports 155 from which inflation gas may exit the inflator 150 after the inflator 150 is activated. In the illustrated embodiment, the ports 155 are in close proximity to the distally positioned mounting stem 151. The first terminus 156 may comprise an electric or electronic connection that is configured to allow inflator 150 to be placed in electronic communication with vehicle sensors. In some embodiments, an end portion of the inflator 150 is positioned within a deflector 157, which may encompass the ports 155. For example, the deflector 157 may receive the end of the inflator 150 and may be coupled to the housing 120 via the distal mounting stem 151.

The mounting stems 151 may be configured to protrude through an aperture of the back wall 125 of the housing. The mounting stems 151 may also protrude through the inflatable airbag 110, and complementary mounting hardware 176, such as a nut.

The airbag cushion 110 may also be configured to fit within the interior void 119 of the housing 120. A variety of types and configurations of inflatable airbag can be utilized. For example, the size, shape, and proportions of the airbag may vary according to its use in different vehicles or different locations within a vehicle such that the airbag may comprise an inflatable curtain cushion, a rear passenger side airbag, a driver's airbag, a knee airbag, and/or a front passenger airbag. Also, the airbag may comprise any suitable material, such as, for example, a woven nylon fabric, which may be coated with a substance, such as silicone. Additionally, the airbag cushion 110 may be manufactured using a variety of techniques such as one piece weaving, cut and sew, or a combination of the two techniques. Further, the airbag cushion 110 may be manufactured using sealed or unsealed seams, wherein the seams are formed by stitching, adhesive, taping, radio frequency welding, heat sealing, or any other suitable technique or combination of techniques. The airbag cushion 110 may also comprise one or more vents, which may be configured as discreet vents or dynamic vents.

Figure 5A:
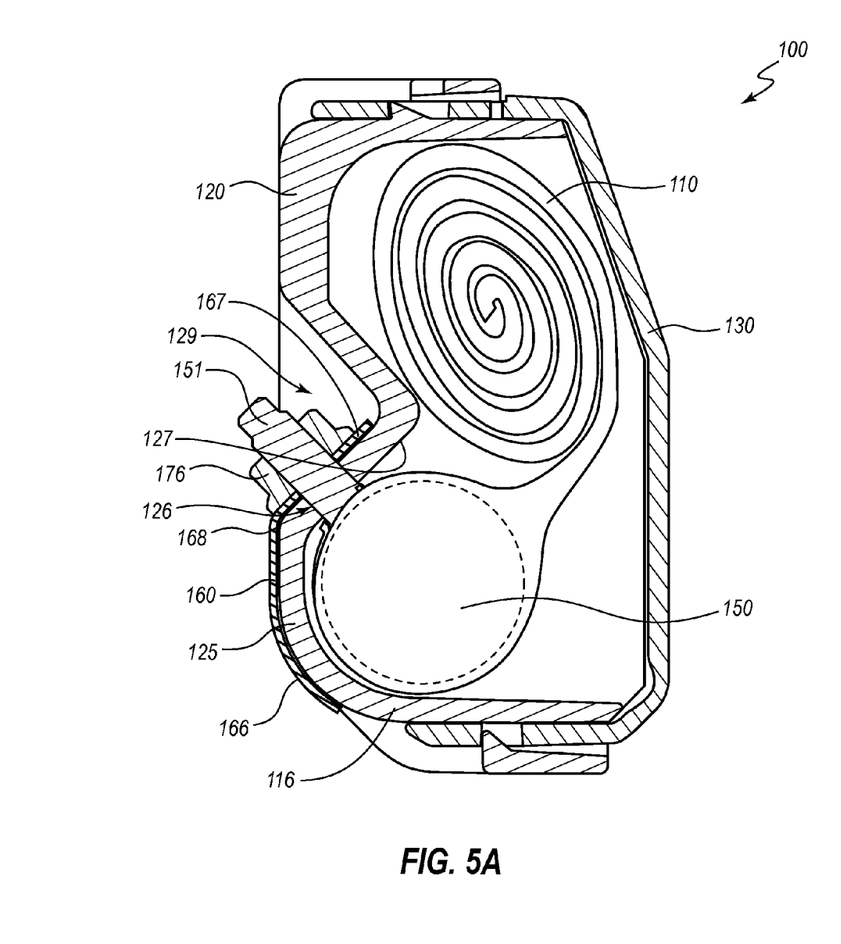
FIG. 5A is a cross-sectional view of the airbag assembly of FIG. 1A, wherein the airbag assembly is in the packaged configuration.
Figure 5B:
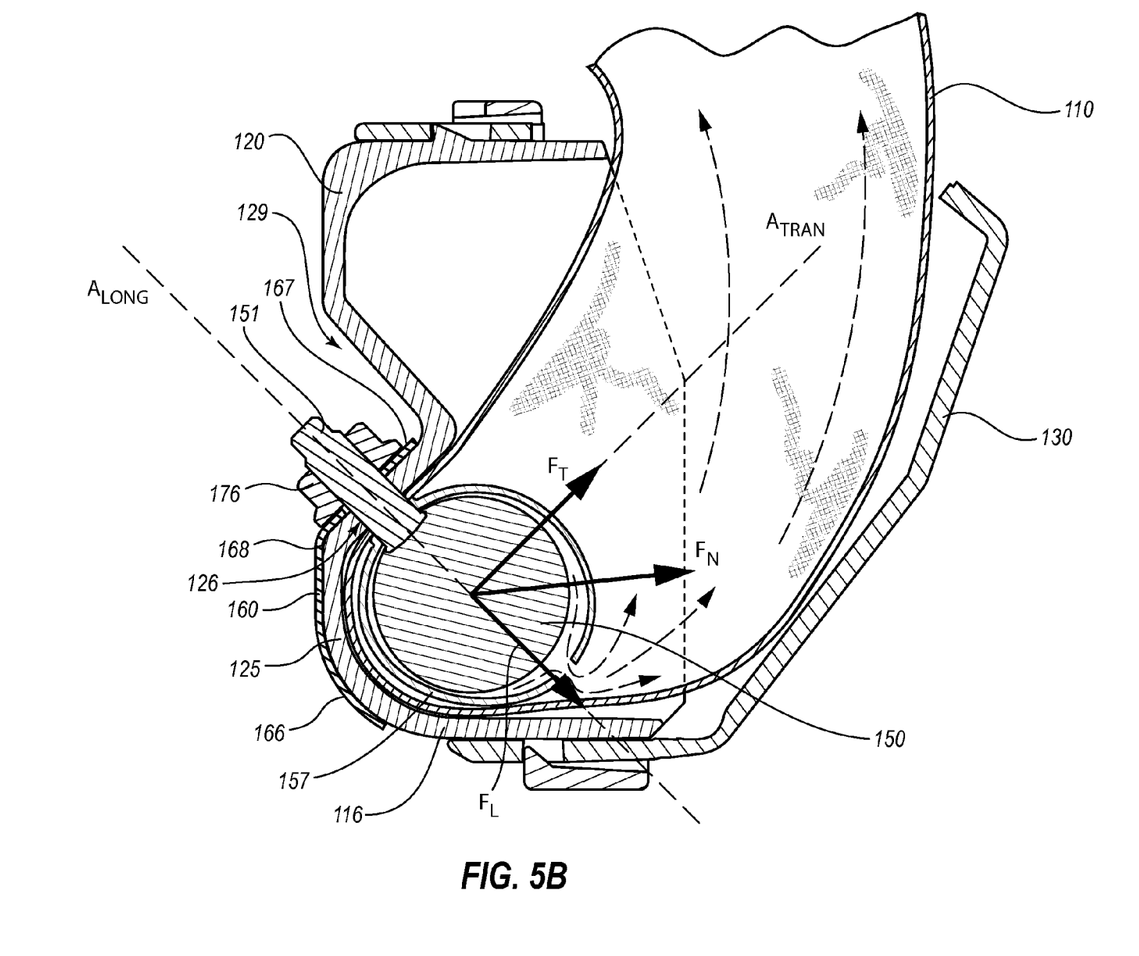
FIG. 5B is another cross-sectional view of the airbag assembly of FIG. 1A, wherein the airbag assembly is in an inflated, deployed configuration.

FIGS. 5A and 5B are cutaway side perspective views of the airbag assembly 100 of FIG. 2. In FIG. 5A, the airbag assembly 100 is in a packaged configuration wherein the airbag cushion 110 is folded or rolled and retained in the airbag housing 120 via the cover 130. In FIG. 5B, the airbag assembly 100 is in inflated, deployed configuration wherein the airbag cushion 110 is inflated or expanded. As shown in the illustrated embodiment, the load distributing plate 160 is coupled to an exterior of the housing 120 via the mounting stem 151 of the inflator 150 and the mounting hardware 176.

As further shown in FIGS. 5A and 5B, the load distributing plate 160 may abut one or more walls of the housing 120. For example, a base portion 168 of the load distributing plate 160 may abut the back wall 125 of the housing 120. For example, an abutting surface of the base portion 168 may be shaped complementarily to the exterior surface of the back wall 125 of the housing so as to snugly rest against the exterior surface. In the illustrated embodiment, the base portion 168 and the back wall 125 are substantially planar along the regions where the load distributing plate 160 contacts the back wall 125. An extension portion 166 of the load distributing plate 160 may be bent or arcuate in shape, and may extend in a curved fashion from the base portion 168. When the load distributing plate 160 is coupled with the housing 120, the extension portion 166 can extend from a position abutting the back wall 125 of the housing 120 to a position abutting the longitudinal sidewall 116 of the housing 120. The housing 120 can be curved in a similar fashion between the back wall 125 and the longitudinal sidewall 116, such that the extension portion 166 can rest flat against the housing 120 in this region as well.

The load distributing plate 160 may define a connection flange 167 that extends from the base portion 168. In the illustrated embodiment, each of the base portion 168 and the connection flange 167 is substantially planar, and these respective portions of the load distributing plate 160 extend at an angle relative to each other. The connection flange 167 can be configured to couple the load distributing plate 160 to the housing 120, for example, via the mounting stem 151. For example, the connection flange 167 can define a connection aperture 162 through which the mounting stem 151 can be advanced. The mounting hardware 176 can be advanced over the mounting stem 151 to compress the connection flange 167 between the mounting hardware 176 and the housing 120.

Figure 6A:
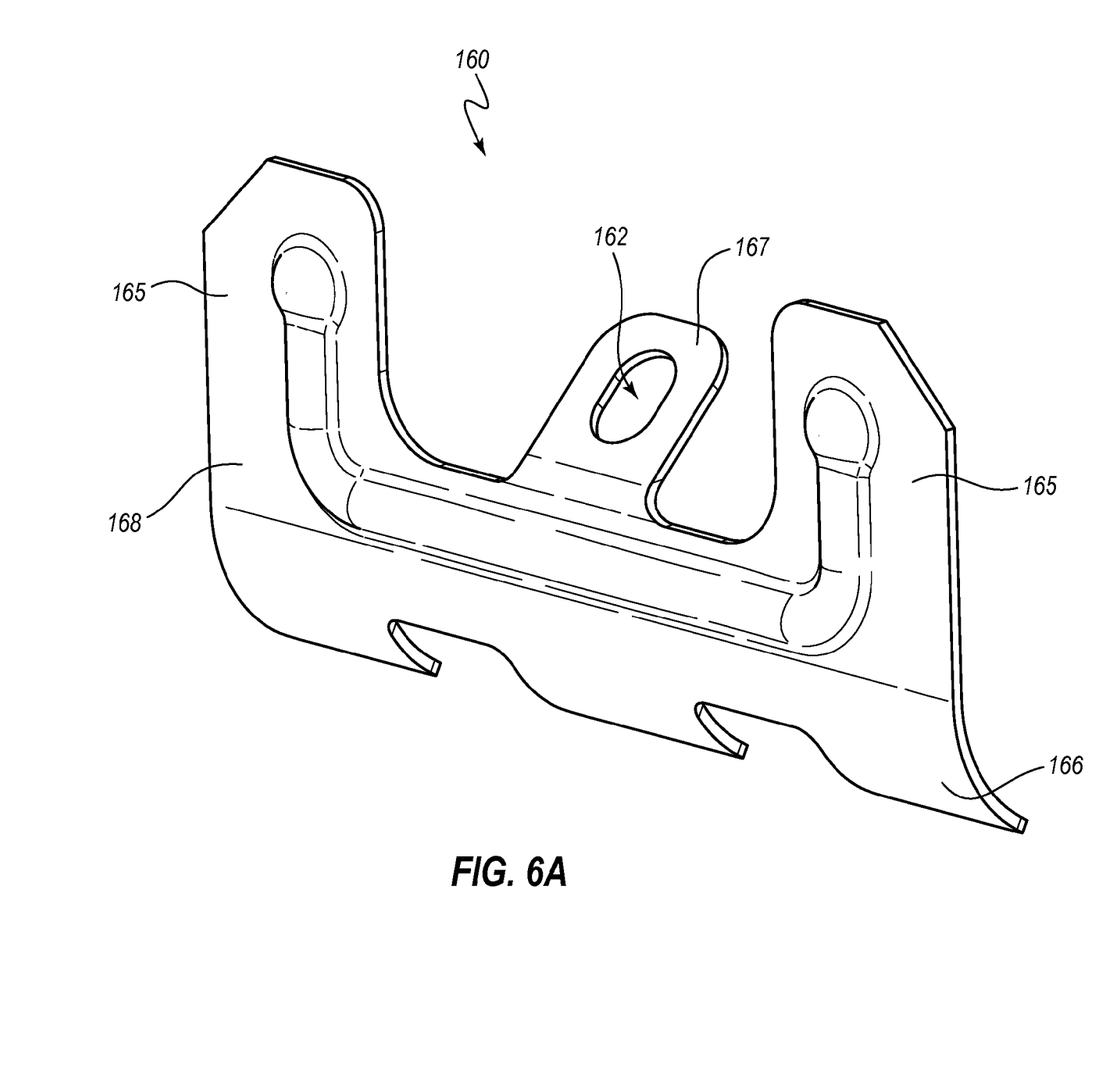
FIG. 6A is a perspective view of a load distributing plate.
Figure 6B:
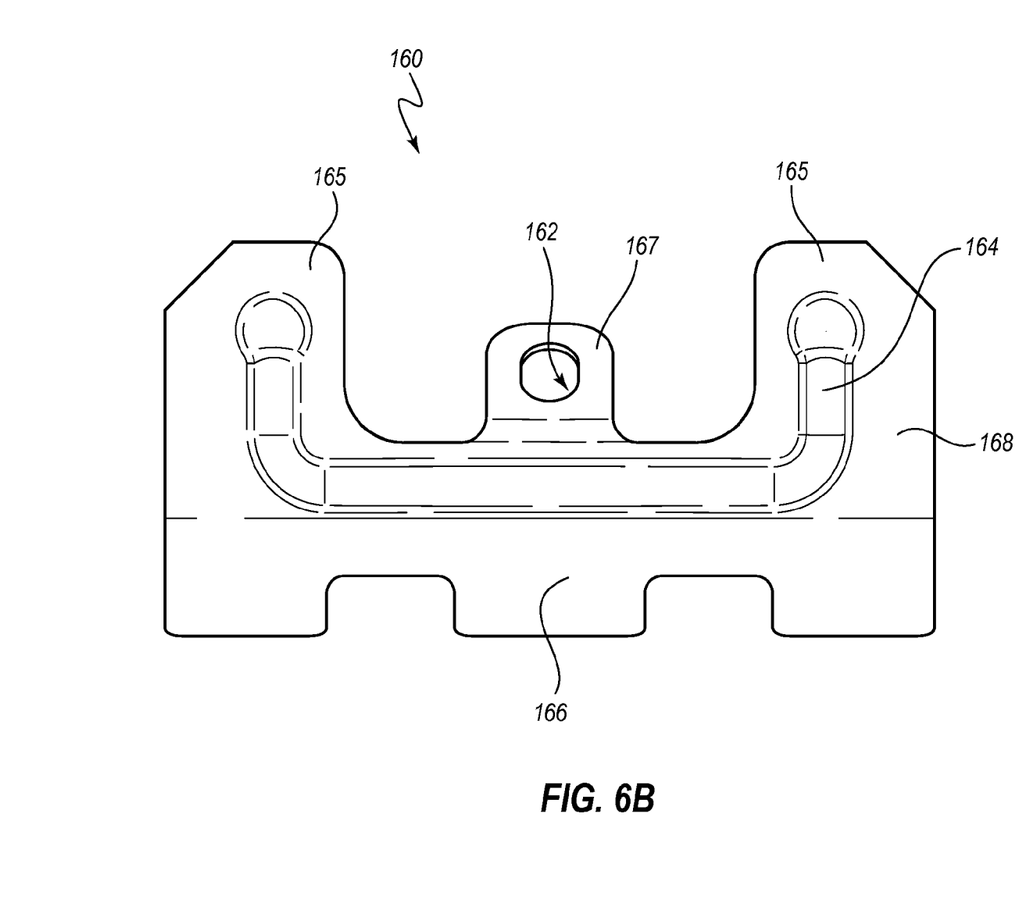
FIG. 6B is a front elevation view of the load distributing plate of FIG. 6A.
Figure 6C:
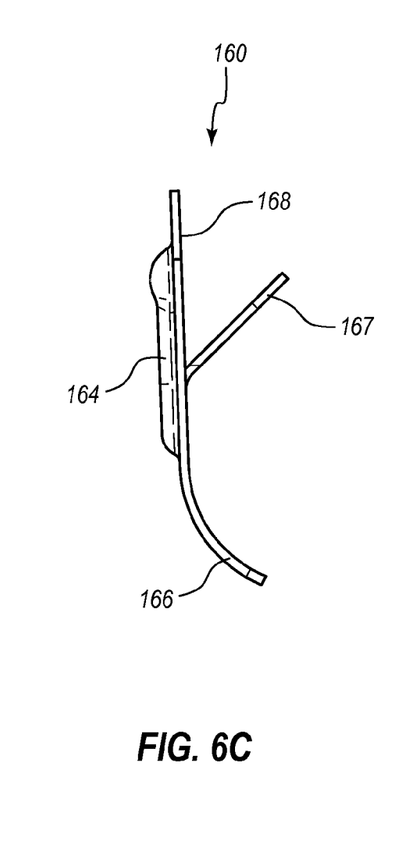
FIG. 6C is a side elevation view of the load distributing plate of FIG. 6A.

FIGS. 6A-6C depict various views of an illustrative embodiment of the load distributing plate 160. FIG. 6A is a perspective view of the load distributing plate 160, FIG. 6B is a front elevation view of the load distributing plate 160 of FIG. 6A, and FIG. 6C is a side elevation view of the load distributing plate 160 of FIG. 6A. The load distributing plate 160 may be formed of any suitable material, or combination of materials, including one or more metals, engineering plastics and/or composite materials. The stiffness of the materials may vary as desired.

The shape and structure of the load distributing plate 160 may vary and may be tailored to a particular housing arrangement. For example, in the illustrated embodiment, the base portion 168 of the load distributing plate 160 is substantially U-shaped and includes opposing branches 165 that extend along either side of the attachment flange 167. As previously discussed, the base portion 168 may be planar and may be configured to be co-planar with a back wall of an airbag housing to which the load distributing plate 160 is configured to be coupled. Also, as previously discussed, the extension portion 166 can be curved to fit to a contour of the housing 120.

The structure of the load distributing plate 160 may be reinforced in any suitable manner. For example, in the illustrated embodiment, the load distributing plate 160 comprises a reinforcement rib 164. The reinforcement rib 164 can inhibit bending of the base portion 168. In the illustrated embodiment, the reinforcement rib 164, like the base portion 168, is substantially U-shaped and extends substantially along a center of the base portion 168. In other or further embodiments, the load distributing plate 160 may comprise one or more beads, darts, or other reinforcement features that may add strength and/or stiffness, as desired.

With reference again to FIGS. 3 and 4, in some embodiments, the inflator 150 includes two mounting stems 151. One of the mounting stems 151 can be closer to the ports 155 of the inflator 150 than the other mounting stem 150. In the illustrated embodiment, the mounting stem 151 that is closer to the ports 155 is furthest from the first terminus 156 and closest to the second terminus 154. As previously discussed, the first terminus 156 may be received within the inflator insert aperture 118 when the assembly 100 is assembled. The housing 120 can define recesses 129 that are configured to receive the mounting hardware 176. The recesses 129 are depressions or cavities that are set back from an exterior surface of the back wall 125, as shown in FIG. 3.

With reference to FIG. 5A, the portions of the housing 120 that define the recesses 129 can define projections or shelves 127 at an interior of the housing 120. The shelves 127 can provide a surface against which the inflator 150 can be mounted. Moreover, in some embodiments, the shelves 127 and neighboring portions of the housing can encompass a large portion of the inflator 150, or stated otherwise, can extend about a large fraction of the perimeter of the inflator 150 (e.g., can extend angularly about no less than 45, 60, 75, 90, 135, 150, or 180 degrees of a circumference of the inflator 150). The mounting stem 151 of the inflator 150 can extend through an opening or aperture 127 defined by the housing.

With reference to FIG. 5B, in some embodiments, relatively high forces can act on the inflator 150 during a deployment event in such a generally encompassed arrangement. As inflation gases exit the inflator 150 at high velocity, a net force $F_N$ may arise in the inflator 150 having one or more of a first component $F_L$ directed along a longitudinal axis $A_{LONG}$ of the inflator stem 151 and a second component $F_T$ along a transverse axis $A_{TRAN}$ that is perpendicular to the longitudinal axis $A_{LONG}$. The net force $F_N$ may arise, for example, from unbalanced gas expulsion rates, increased pressure in the region between the inflator ports 155 and the deflector 157 and/or the housing 120, etc. In some embodiments, the deflector 157 may redirect gases that exit from the inflator ports 155, and the deflector 157 may affect the ultimate direction of the net force $F_N$. In some embodiments, the deflector 157 may substantially eliminate any force component $F_T$ along a transverse axis $A_{TRAN}$.

With reference to FIGS. 3 and 5B, the force $F_L$ directed along the longitudinal axis $A_{LONG}$ of the mounting stem 151 can urge the mounting hardware 176 toward an interior of the housing 120. In the absence of the load distributing plate 160, the force $F_L$ could be sufficient to crack or break the housing 120 at the position of the hardware 176, in some instances, as the hardware 176 has a relatively small surface area. However, the load distributing plate 160 can redistribute at least a portion of the force $F_L$ to other portions of the housing 120 that are spaced from the mounting hardware 176. The portions of the housing 120 to which the forces are redistributed can aid in counteracting the forces. In particular, as shown in FIG. 3, the base portion 168, which includes the branches 165, can distribute the pulling forces to a much greater surface area of the housing 120 (e.g., a large portion of the back wall 125) and also to a position that is distanced from the mounting hardware 176.

With reference to FIG. 5B, the force $F_T$ directed along the transverse axis $A_{TRAN}$ of the mounting stem 151 can tend to rotate the mounting stem 151 in a counterclockwise direction, in the illustrated view, due at least in part to the constriction provided by the portion of the housing 120 that defines the aperture 126. In the absence of the load distributing plate 160, the force $F_T$ could be sufficient to crack or break the housing 120 at the position of the mounting stem 151, in some instances, as the mounting stem 151 has a relatively small surface area. However, the load distributing plate 160 can redistribute at least a portion of the force $F_T$ to other portions of the housing 120 that are spaced from the mounting stem 151. In particular, the base portion 168 can distribute the rotational or torsional forces to a much greater surface area of the housing 120 (e.g., a large portion of the back wall 125 and the longitudinally extending sidewall 116) and also to a position that is distanced from the mounting stem 151 (e.g., toward the sidewall 116). The portions of the housing 120 to which the forces are redistributed can aid in counteracting the forces. In the illustrated embodiment, the extension portion 166 of the load distributing plate 160 is curved and closely matches a curved portion of the housing 120 that joins the walls 125, 116. This close match can aid in the transfer of forces from the load distributing plate 160 to a large surface area of the housing 120.

With reference to FIGS. 3 and 4, in the illustrated embodiment, the load distributing plate 160 is configured to interact with only one of the mounting stems 151 and its associated mounting hardware 176. The load distributing plate 160 may be used where the forces acting on the housing are greatest and/or most problematic to the structural integrity of the housing. In the illustrated embodiment, the load distributing plate 160 is used with the mounting stem 151 that is closest to the ports 155 of the inflator 150. In some instances, the forces acting on that mounting stem 151 may be greater than those acting on the other mounting stem 151 and/or those acting at the first terminus 156 of the inflator 150. For example, the first terminus 156 or, in other instances, the mounting stem 151 that is closest to the terminus 156, can generally act as a fulcrum about which the inflator 150 may be urged to rotate during deployment. If the gas-dispensing end of the inflator 150 is prevented from moving relative to the housing (e.g., via the load distributing plate 160 that is mounted at the gas-dispensing end), then relatively few forces may arise at the proximal mounting stem 151 and/or the terminus 156, in some instances. In some instances, mounting a load distributing plate 160 to only one of the inflator mounting stems 151, as opposed to using multiple load distributing plates 160 or using a single elongated load distributing plate 160 that redistributes loads from both mounting stems 151, may reduce material costs and facilitate assembly of the airbag assembly 100. Accordingly, in various embodiments, one or more load distributing plates 160 may be positioned at only the primary points of failure and may reduce the overall material costs of the assembly 100.

In view of the foregoing, it can be seen that in some embodiments, inflatable airbag cushions can be rolled and/or folded into an airbag assembly. During deployment, the airbag cushion can rapidly change from a packaged configuration to an inflated, deployed configuration. Various forces may be exerted on the airbag housing during the deployment and inflation processes. These forces may be localized and may cause significant damage to the airbag assembly. A load distributing plate may be configured, in some arrangements, to distribute or delocalize these forces. In certain embodiments, the load distributing plate may be coupled to an exterior surface of the airbag housing, for example, by a mounting stem of an inflator. The load distributing plate may be utilized to minimize and/or eliminate the damage caused by deployment and inflation of the airbag cushion.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An airbag assembly comprising:
   a housing defining a cavity and an aperture and comprising a mounting region that is spaced from the aperture, wherein the mounting region is configured to couple the housing with a vehicle structure, wherein the housing comprises a wall that includes a recess, and wherein the aperture of the housing is defined by a portion of the housing that defines at least a portion of the recess;
   an inflatable airbag positioned within the cavity of the housing;
   an inflator positioned within the cavity of the housing and fluidly coupled with the airbag;
   a mounting stem fixedly attached to the inflator and extending through the aperture of the housing from a position at an interior of the cavity of the housing to a position at an exterior of the housing; and
   a load distributing plate attached to the mounting stem at an exterior of the housing, wherein the load distributing plate is configured to transfer a force that arises in the mounting stem when the inflator is activated to a region of the housing that is spaced from the aperture, wherein the load distributing plate is spaced from the mounting region of the housing so as not to directly transfer the force from the mounting stem to the vehicle structure, and wherein the load distributing plate comprises an attachment flange that extends into the recess and comprises a base portion that rests against a portion of the wall of the housing that is spaced from the recess.

2. The airbag assembly of claim 1, wherein the mounting region of the housing is defined by a flange at a periphery of the housing.

3. The airbag assembly of claim 2, wherein the flange defines an opening through which mounting hardware can be passed to couple the housing with a vehicle structure.

4. The airbag assembly of claim 1, wherein the mounting region is defined by a flange that extends from a wall of the housing, and wherein the aperture of the housing is defined by the wall of the housing.

5. The airbag assembly of claim 1, wherein the housing is elongated in a longitudinal direction and comprises two longitudinal ends, wherein the mounting region is at one of the longitudinal ends of the housing, and wherein the load distributing plate is coupled to the housing at a position that is spaced from each of the longitudinal ends.

6. The airbag assembly of claim 5, wherein the housing comprises an additional mounting region that is spaced from the aperture of the housing, and wherein a separate mounting region is located at each of the longitudinal ends of the housing.

7. The airbag assembly of claim 1, wherein the load distributing plate comprises an extension that is configured to interact with an exterior surface of the housing to counteract a torsional force that arise in the mounting stem when the inflator is activated.

8. The airbag assembly of claim 1, wherein the load distributing plate comprises:
   a first portion that is substantially U-shaped;
   a second portion that is arcuate in shape; and
   a third portion that is configured to couple the load distributing plate to the airbag housing.

9. The airbag assembly of claim 8, wherein the first portion comprises a reinforcement rib.

10. The airbag assembly of claim 1, wherein the load distributing plate is stiffer than a region of the housing at which the load distributing plate is located.

11. An airbag assembly comprising:
    a housing defining a cavity and comprising one or more mounting regions that are configured to couple the housing with a vehicle structure, wherein the housing comprises a wall that includes a recess, and wherein the aperture of the housing is defined by a portion of the housing that defines at least a portion of the recess;
    an inflatable airbag positioned within the cavity of the housing;
    an inflator positioned within the cavity of the housing and fluidly coupled with the airbag, wherein the inflator is attached to the housing; and
    a load distributing plate attached to the housing at a first portion of the housing, wherein the load distributing plate comprises an attachment flange that extends into the recess and comprises a base portion that rests against a portion of the wall of the housing that is spaced from the recess, wherein the load distributing plate is configured to transfer a force that arises when the inflator is activated from the first portion of the housing to a second portion of the housing that is spaced from the first portion of the housing, and wherein the load distributing plate is configured to transfer forces solely to regions of the housing that are spaced from the one or more mounting regions.

12. The airbag assembly of claim 11, wherein the load distributing plate is at an exterior of the housing.

13. The airbag assembly of claim 11, wherein the load distributing plate is attached to the inflator.

14. The airbag assembly of claim 11, further comprising a mounting stem configured to couple the inflator to the housing and to the load distributing plate.

15. The airbag assembly of claim 11, wherein the one or more mounting regions comprise one or more mounting flanges that define openings through which hardware can be inserted.

16. The airbag assembly of claim 11, wherein the load distributing plate comprises an attachment flange and base portion, wherein the attachment flange is directly attached to the housing.

17. An airbag assembly comprising:
  a housing defining a cavity and comprising a mounting region that is spaced from the aperture, wherein the mounting region is configured to couple the housing with a vehicle structure;
  an inflatable airbag positioned within the cavity of the housing;
  an inflator positioned within the cavity of the housing and fluidly coupled with the airbag;
  a first mounting stem and a second mounting stem that are each fixedly attached to the inflator and extend through the housing from an interior of the cavity of the housing to an exterior of the housing; and
  a load distributing plate attached to the first mounting stem but not the second mounting stem, wherein the load distributing plate is configured to transfer a force that arises in the first mounting stem when the inflator is activated to a region of the housing that is spaced from the first mounting stem, and wherein the load distributing plate is spaced from the mounting region of the housing so as not to directly transfer the force from the first mounting stem to the vehicle structure.

18. The airbag assembly of claim 17, wherein the housing is elongated in a longitudinal direction between two longitudinal ends, and wherein the first mounting stem is closer to a longitudinal center of the housing than is the second mounting stem.

19. The airbag assembly of claim 17, wherein the inflator comprises a plurality of ports through which inflation gases are permitted to exit the inflator, and wherein the first mounting stem is closer to the plurality of ports than is the second mounting stem.

\* \* \* \* \*